April 17, 1962 G. E. BARNHART 3,030,159
CYLINDER CONSTRUCTION
Filed Nov. 17, 1958 2 Sheets-Sheet 1

INVENTOR
GEORGE E. BARNHART
BY
Mason & Graham
ATTORNEYS

April 17, 1962 G. E. BARNHART 3,030,159
CYLINDER CONSTRUCTION
Filed Nov. 17, 1958 2 Sheets-Sheet 2
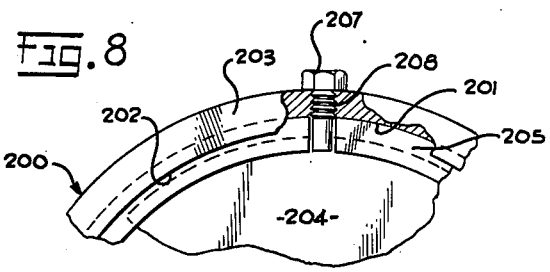
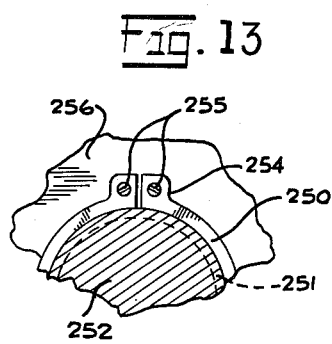
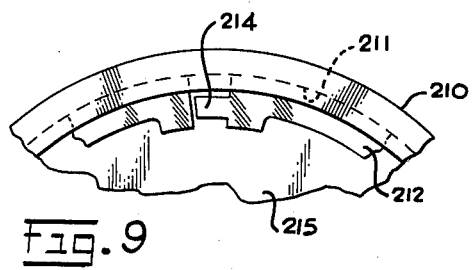
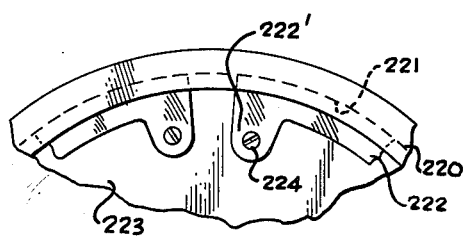
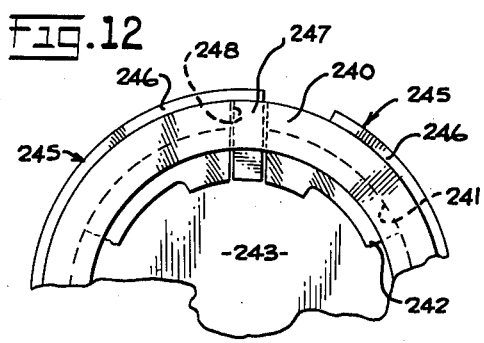
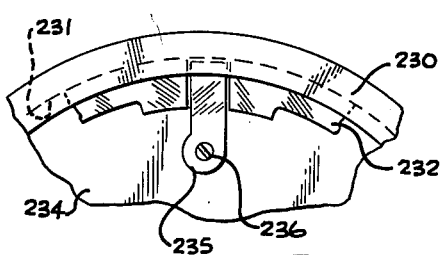
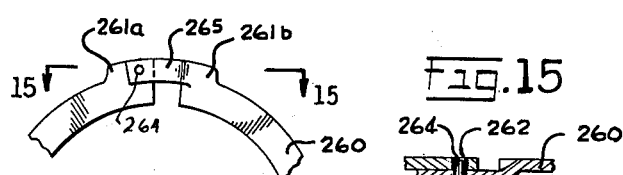
INVENTOR.
GEORGE E. BARNHART
BY
Mason & Graham
ATTORNEYS 3,030,159
CYLINDER CONSTRUCTION
George E. Barnhart, 228 New York Drive,
Altadena, Calif.
Filed Nov. 17, 1958, Ser. No. 778,552
13 Claims. (Cl. 309—2)

This invention has to do with cylindrical metal forms and particularly with piston or cylinder assemblies to be used for power elements or accumulators. This application is a continuation in part of my co-pending application, Serial No. 568,120, now Patent No. 2,865,693, filed February 27, 1956, as a divisional application of my then co-pending application, Serial No. 430,479, filed May 18, 1954, now Patent No. 2,785,026, issued March 12, 1957.

Heretofore it has been customary to shape cylindrical members to size by machining. I find that I can provide a greatly improved product by cold-working metal cylindrical members to certain preferred shapes. The members so formed have greatly increased strength over machined members of the same material and are thus able to withstand much higher internal fluid pressures than has heretofore been possible with machined elements. Also, I am able to obtain extremely smooth, dense surfaces free of porosity and foreign matter. In this connection it is known that many metals, particularly aluminum alloys, pick up abrasive material when honed and this destroys conventional seal rings.

An object of the invention is to provide novel and improved cylindrical members particularly designed to hold fluid pressure which are much stronger than machined members and which have extremely smooth, dense surfaces free of foreign matter.

Another object is to provide novel and improved constructions for joining cylinder heads or end closures and other elements to cylinders.

A further object is to provide a piston and cylinder construction which is easy to assemble and to disassemble.

These and other objects will be apparent from the drawings and the following description. Referring to the drawings:

FIG. 8 is a fragmentary sectional view of a portion of a cylinder showing means for retaining a snap ring therein;

FIGS. 9 through 12 are views similar to FIG. 8, but showing alternate forms of snap ring retaining means;

FIG. 13 is a cross-sectional, fragmentary view through a shaft and piston, or piston and a surrounding body, showing an alternate snap ring retaining means;

FIG. 14 is a fragmentary face view of another form of snap ring; and

FIG. 15 is a sectional view on line 15—15 of FIG. 14.

Figure 5:
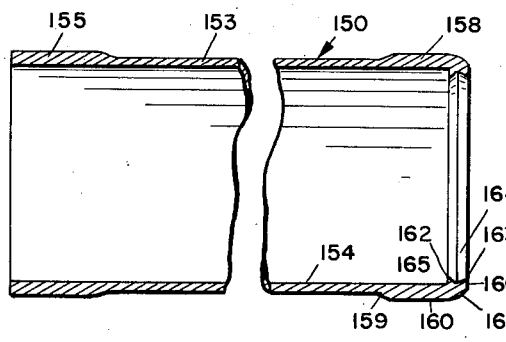
FIG. 5 is a central sectional view of an alternate cylinder construction.
Figure 2:
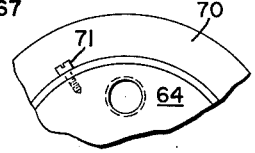
FIG. 2 is a fragmentary end elevation on line 2—2 of FIG. 1.
Figure 6:
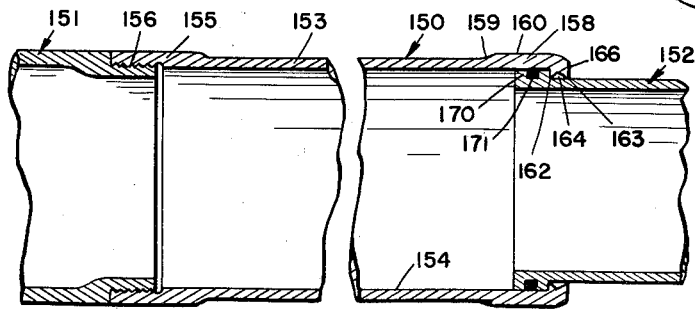
FIG. 6 is a fragmentary sectional view of an assembled tubular structure.
Figure 1:
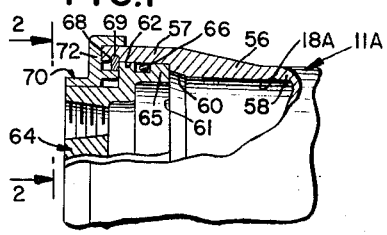
FIG. 1 is a fragmentary sectional view of a cylinder end construction.
Figure 7:
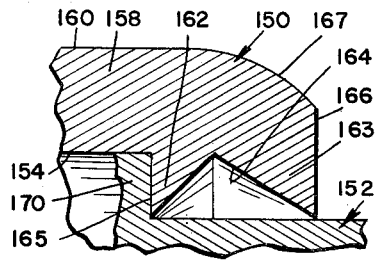
FIG. 7 is a sectional detail view of the end portion of the cylinder of FIG. 5 and a second tubular member but on a larger scale.

In FIG. 1 I show a form of construction wherein a cylinder 11A is formed similarly at each end, one end only being shown. This is provided with a thickened tapered portion 56 and beyond this at its end with an end portion 57 which is thicker than the wall 58 of the main portion of the cylinder. The inner surface of the cylinder is cylindrical at 18A and beyond this there is a tapered surface 60 which terminates in a shoulder 61, outwardly of which is a counterbore-like surface 62. The end portion of the cylinder accommodates a cylinder head 64 which has a cylindrical rim 65 received within the end of the cylinder against the shoulder 61. The head my be provided with a packing ring 66 as shown.

The head is releasably retained with a snap or split ring 68 in a groove 69 of the cylinder. A guard ring 70, retained by several screws 71, fits over the end of the cylinder, being shaped to provide an axially extending channel 72 which accommodates the end of the cylinder and the ring 68.

Figure 3:
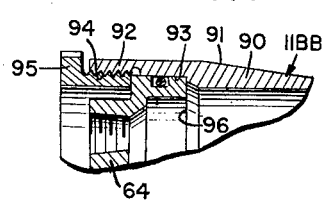
FIGS. 3 and 4 are fragmentary sectional detail views of alternate cylinder end constructions.

In FIG. 3 I show a modified form of end construction for the left end of a cylinder 11BB. In this form the cylinder wall is provided with a thickened section 90 which has an outer tapered surface 91. Beyond this is a cylindrical section 92 provided with a cylindrical inner surface 93 to receive the cylinder head 64 which is the same as that previously shown and described in FIG. 1. Outwardly of the surface 93 is a somewhat larger interiorly threaded surface 94 into which is removably threaded a lock ring 95 for the purpose of holding the head 64 in place against shoulder 96.

Figure 4:
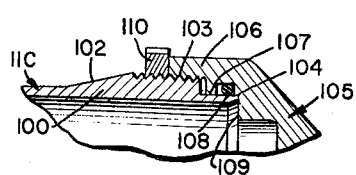

In FIG. 4 there is shown another modification in which a cylinder member 11C is provided with a thickened end portion 100 having a tapered surface 102 and outwardly of this a threaded substantially cylindrical surface 103. At the extreme end portion of the cylinder the wall thickness is reduced and a cylindrical wall surface 104 provided. A head member 105 having a stepped inner surface is threadedly mounted on the end of the cylinder having a threaded end portion 106 for this purpose. This member also has a grooved cylindrical surface 107 carrying a seal ring 108 which surrounds the surface 104. Shoulder 109 provides an abutment against the end of the cylinder. A lock ring 110 is threaded onto the cylinder 11C.

Referring now to FIGS. 5–7, 150 indicates a cylindrical member 151, a tubular member to which it is joined, and 152, a second tubular member fitted in cylinder 150 for telescoping movement therein. The cylinder 150 has a main, central wall 153 of even wall thickness with a cylindrical inner surface 154. At one end, an externally thickened end section 155 having a threaded interior area 156 is provided. Member 151 threads into the end section 155 as shown. At its other end the cylinder terminates in an externally thickened section 158 which includes a tapered outer surface 159 and a cylindrical outer surface 160. The end portion of the cylinder is formed to provide axially spaced, radially inwardly extending sections 162 and 163 separated and in part defined by a V-groove 164. The inner surface 165 of section 162 is in a plane normal to the longitudinal axis of the cylinder defining a shoulder at the end of surface 154. The outer end of the cylinder has an end surface 166 in a plane normal to the axis of the cylinder. Between surfaces 160 and 166 is a radius 167.

Member 152 has a flat flange 170 of a size to slidably fit within the cylinder and this carries a seal ring 171. The member 152 is thus retained in cylinder 150 by the portion 162 thereof.

In all cases, the cylindrical members shown preferably are formed to their respective shapes by cold-working, drawing, pressure-forming, or rolling, resulting in an extremely strong construction well suited for use where fluid pressures must be contained.

In FIG. 8 I show another means of securing a snap ring or split ring against being accidentally dislodged from its associated groove. By way of illustration, I show one end portion of a cylinder designated 200 which is formed with an internal groove 201 in its inner surface 202, the groove being spaced from the end surface 203 of the cylinder. Within the end of the cylinder is a head 204 which is shown retained by a split ring 205 mounted in the groove 201. To prevent premature or accidental escape of the ring 205 from its groove where it serves to overlie and retain the head member 204, or any other suitable member, I provide a cap screw 207 which is threadedly mounted in a threaded bore 208 in the cylinder extending radially through the wall of the cylinder into the space between the ends of the split ring 205. Thus with the screw in place the ring cannot be flexed either accidentally or purposely sufficiently to enable its escape or removal from the groove 201.

It is also an object of the invention to provide various other novel alternate constructions for releasably retaining a split ring or snap ring in place in a groove where the ring must be contracted diametrically in order to remove it from the groove. Referring now to FIG. 9, a cylindrical member 210 is shown with an internal groove 211 accommodating a special snap ring 212. This ring has an extension or projection 214 at one end which normally lies in the general plane of the ring so that it extends substantially to the other end thereof but which is capable of being sprung out of such plane axially of the ring sufficiently to enable the contraction of the ring for removal from the groove. 215 designates a member retained by the ring.

In FIG. 10 I show a cylindrical member 220 having a groove 221 on its inner surface in which is mounted a split ring 222 for retaining a head member 223 or the like. The ring is formed with enlarged apertured end portions 222' and these receive anchor screws 224 which are mounted in tapped holes (not shown) in the head 223. In order to remove the ring from the groove it is necessary first to remove the screws 224.

Referring now to FIG. 11, I show a cylindrical member 230 having an internal groove 231 accommodating a split ring 232 for retaining a head or other member 234. The retainer member in this instance comprises a key 235 adapted to extend between the ends of the ring and be anchored in place by a screw 236 threaded into member 234. Here again in order to remove the ring, key 235 must be removed.

Referring to FIG. 12, I show a cylindrical member 240 having an internal groove 241 with a split ring or snap ring 242 in the groove and serving to retain member 243 inwardly thereof in the cylindrical member. In order to releasably retain ring 242 I provide a retainer member designated 245 which comprises a circular spring 246 having a key 247 at its end received in a hole 248 in the member 245 and projecting therethrough into the space between the ends of ring 242. If desired, member 246 may be anchored to member 240. The split ring cannot escape until the key 247 is withdrawn.

Although I have shown various forms of my invention, I contemplate that various changes and modifications can be made therein without departing from the scope of the invention as indicated by the claims which follow. In this connection, although I have been particularly concerned with retaining a snap ring in a groove which surrounds the ring, it has not been my intent to limit the invention to this and, therefore merely by way of illustration, I show in FIG. 13 a snap ring 250 in a groove 251 in the periphery of a shaft 252. The snap ring is provided with apertured ears 254 at its ends and screws 255 are mounted in these and threaded into the end surface of a piston or other element 256 directly behind the ring 250. It may be assumed that the piston is seated against a shoulder or other conventional means (not shown) at its far end. In place of the construction shown I may alternately use a retaining means comprising a plurality of spaced plates, such as those designated 47 in FIGS. 1 and 3 of Patent No. 2,865,693. These would be mounted on the element 256 adjacent the periphery of ring 250.

It will be apparent from the above that many of the forms of my split or snap ring retainer means can be readily modified to retain rings which are seated in the peripheral groove of an element. A further example in this connection is shown in FIGS. 14 and 15 wherein numeral 260 designates a snap ring having enlarged end portions 261a and 261b. The former is provided with a hole 262 to receive a stud 264 on an extension 265 projecting beyond portion 261b. The extension 265 is laterally offset and capable of being sprung outwardly to assemble or disassemble the ring. The construction affords a unique, self-retaining ring.

I claim:
1. In a tubular assembly, a cylindrical outer member having a cylindrical inner surface extending a substantial portion of the length of the member, an outwardly flared surface at one end of said inner surface, a radial outwardly projecting shoulder at the end of said flared surface, and a cylindrical surface extending from said shoulder to the adjacent end of said outer member, said last mentioned cylindrical surface being interrupted by a circumferential groove, an inner member having a cylindrical portion mounted in said outer member against said shoulder, a retaining ring in said groove overlying an outwardly facing portion of said inner member to retain the same, a guard member formed to provide a cylindrical, axially-facing channel receiving an end portion of said outer member and said retaining ring whereby to prevent dislodgement of said ring from said groove, and detachable means securing said guard member to one of said inner and outer members.

2. In a tubular assembly, a cylindrical outer member having a cylindrical inner surface extending a substantial portion of the length of the member, an outwardly flared surface at one end of said inner surface, a radial outwardly projecting shoulder at the end of said flared surface, a second cylindrical surface extending from said shoulder toward the adjacent end of said outer member, and a threaded surface extending from said second cylindrical surface to the end of said outer member, an inner member having a cylindrical portion received in said outer member in the region of said second cylindrical surface and against said shoulder, and a retaining ring threadedly secured in the threaded portion of said outer member and abutting said inner member.

3. In a tubular assembly, a first cylindrical member having a cylindrical inner surface, said member being characterized by having a thick section adjacent one end thereof and a relatively thin short section between said thick section and the adjacent end of the member, said thick section being externally threaded, and a second member having a cylindrical inner surface and a radial inwardly extending shoulder therebeyond, said cylindrical surface of said second member being adapted to receive the end portion of said first member, said second member having a threaded portion of greater diameter adapted to be threaded upon and receive the threaded portion of said cylindrical member, and a threaded ring mounted on the threaded portion of the first member and threaded against the end of said second member.

4. A tubular metal member comprising an open-ended cylindrical body having an elongated cylindrical main wall section of constant thickness, an outwardly thickened end section beyond said main section, a pair of radially inwardly projecting annular portions at the end of said thickened section, said portions being defined by a V-groove therebetween of uneven-length sides and by axially inner and outer surfaces normal to the axis of the member.

5. In combination, a first member, a second member, said first and second members having interfitting cylindrical portions, one of said members having a circumferential groove in its cylindrical portion, a third member for limiting relative axial movement between said first and second members, said third member comprising a flexible split ring in said groove projecting into the path of the other of said first and second members and having a space between its ends, and a ring retainer member detachably secured to one of said first and second members and extending into the space between the ends of said split ring whereby to prevent the same from flexing sufficiently to escape from said groove.

6. The combination set forth in claim 5 in which the ring retainer member consists of a screw threadedly mounted in one of said first and second members and extending radially between the ends of said split ring.

7. In combination, a first member having a cylindrical inner surface with a circumferential groove in said surface, a second member having a cylindrical portion received in said first member, a split ring in said groove projecting into the path of said second member, said split ring having an integral extension at one end in a region beyond the confines of said groove and in the plane of the ring and substantially extending to the other end of said ring, said extension being capable of being sprung axially to permit the contraction of said split ring.

8. In combination, a first member having an internal cylindrical surface with a circumferential groove therein, a second member having a cylindrical portion within the cylindrical portion of said first member, a split ring in said groove in the path of said second member, and means for retaining said ring against contraction such as would permit escape of the ring from the groove, said means comprising a key member between the ends of said ring, and means detachably securing the key member to said first member.

9. In combination, a first member having an internal cylindrical surface with a circumferential groove therein, a second member having a cylindrical portion within the cylindrical portion of said first member, a split ring in said groove in the path of said second member, and means for retaining said ring against contraction such as would permit escape of the ring from the groove, said means comprising a key extending through said first member into the space between the ends of said ring, and an elongated spring extending from said key around a portion of said first member.

10. In combination, a first member having an internal cylindrical surface with a circumferential groove therein, a second member having a cylindrical portion within the cylindrical portion of said first member, a split ring in said groove in the path of said second member, and means for retaining said ring against contraction such as would permit escape of the ring from the groove, said means comparising screws extending through the end portions of said ring and threaded into said second member.

11. In combination, a first member having a peripheral cylindrical surface with a circumferential groove therein, a second member having a cylindrical internal surface receiving said first member, a split ring in said groove adjacent an outwardly extending radial surface formed on said second member, and means carried by one of said members effectively in the path of expansion of said split ring whereby to prevent the same to escape from said groove.

12. A snap ring comprising a split annular body terminating in end portions normally spaced from each other, and an intrgeal extension on one end portion projecting toward the other end portion, said projection being springable axially of the body.

13. A snap ring as set forth in claim 12 in which said extension is axially offset from the plane of the body of the ring and overlaps said other end portion, and in which interengaging means is provided between the extension and said other end portion preventing expansion or contraction of said ring.

References Cited in the file of this patent

UNITED STATES PATENTS

| | | |
|---|---|---|
| 1,597,249 | Riley | Aug. 24, 1926 |
| 1,730,905 | Thomas et al. | Oct. 8, 1929 |
| 2,382,947 | Brozek | Aug. 14, 1945 |
| 2,492,006 | Raybold | Dec. 20, 1949 |
| 2,647,656 | Frisch | Aug. 4, 1953 |
| 2,681,043 | Irwin | June 15, 1954 |
| 2,712,952 | Lundgren | July 12, 1955 |
| 2,749,162 | Humphrey | June 5, 1956 |
| 2,790,462 | Ashton | Apr. 30, 1957 |
| 2,862,467 | Ballard | Mar. 11, 1958 |
| 2,865,693 | Barnhardt | Dec. 23, 1958 |
| 2,960,359 | Leland | Nov. 15, 1960 |

FOREIGN PATENTS

| | | |
|---|---|---|
| 305,809 | Switzerland | May 16, 1955 |